United States Patent
Foes et al.

(10) Patent No.: US 11,946,460 B1
(45) Date of Patent: Apr. 2, 2024

(54) THERMAL-MECHANICAL LINEAR ACTUATOR

(71) Applicant: Raytheon Company, Waltham, MA (US)

(72) Inventors: Scott R. Foes, Torrance, CA (US); Ray E. Mcvey, Redondo Beach, CA (US); Scott Randall Sorbel, Tucson, AZ (US); Tim P. Johnson, Torrance, CA (US); Nicholas C. Yiakas, Redondo Beach, CA (US)

(73) Assignee: Raytheon Company, Tewksbury, MA (US)

(*) Notice: Subject to any disclaimer, the term of this patent is extended or adjusted under 35 U.S.C. 154(b) by 0 days.

(21) Appl. No.: 18/088,224

(22) Filed: Dec. 23, 2022

(51) Int. Cl.
   *F03G 7/06* (2006.01)

(52) U.S. Cl.
   CPC .............................. *F03G 7/06114* (2021.08)

(58) Field of Classification Search
   CPC .............................. F03G 7/06; F03G 7/06114
   See application file for complete search history.

(56) References Cited

U.S. PATENT DOCUMENTS

| | | |
|---|---|---|
| 3,937,019 A | 2/1976 | Renner |
| 5,054,996 A | 10/1991 | Carreno |
| 6,490,394 B1 | 12/2002 | Beall et al. |
| 7,256,518 B2 | 8/2007 | Gummin et al. |
| 7,692,361 B2 | 4/2010 | Kato et al. |
| 11,118,576 B2 | 9/2021 | Okazaki et al. |
| 11,274,664 B1 | 3/2022 | Skeels |
| 11,286,549 B2 | 3/2022 | Monroe et al. |
| 2005/0151443 A1* | 7/2005 | Seeley ............... H10N 30/88  310/313 B |
| 2006/0279177 A1* | 12/2006 | D'Almeida ............ F16D 65/14  310/348 |
| 2009/0236441 A1* | 9/2009 | Hess ................... F02M 61/167  239/102.2 |
| 2011/0209769 A1* | 9/2011 | Chun ................... F16K 31/002  137/2 |

(Continued)

FOREIGN PATENT DOCUMENTS

| | | |
|---|---|---|
| EP | 0750114 A1 * | 12/1996 |
| EP | 0850365 B1 | 8/1999 |

(Continued)

OTHER PUBLICATIONS

Bugby et al., Extended Stroke and Miniaturized Reverse-Operation DTE Thermal Switches, 50th International Conference on Environmental Systems, Jul. 2021, 10 pages, California Institute of Technology.

*Primary Examiner* — Laert Dounis

(57) ABSTRACT

A thermal-mechanical linear actuator can include a first stage comprising one of a positive coefficient of thermal expansion ("CTE") material or a negative CTE material and a second stage comprising the other of the positive CTE material or the negative CTE material. The second stage can be at least partially inserted into the first stage. The actuator can further comprise a thermal isolator disposed between the first stage and the second stage to thermally isolate the first stage from the second stage. Heat inputs can be provided where the heat inputs can control the temperature of the first and second stages independently. A hyperbolic meta material can be wrapped or coated around the first stage.

20 Claims, 6 Drawing Sheets

(56) References Cited

U.S. PATENT DOCUMENTS

| | | |
|---|---|---|
| 2013/0047603 A1 | 2/2013 | Matsuki |
| 2017/0234306 A1* | 8/2017 | Vanden Aker ........ C22C 19/007 |
| | | 60/529 |
| 2019/0242369 A1* | 8/2019 | Huber ..................... B32B 7/027 |
| 2021/0208360 A1 | 7/2021 | Levin et al. |
| 2023/0144229 A1* | 5/2023 | Kilchyk ................. B22F 10/20 |
| | | 60/527 |

FOREIGN PATENT DOCUMENTS

| | | |
|---|---|---|
| WO | WO 2021/029946 | 2/2021 |
| WO | WO 2022/171215 A1 | 8/2022 |

* cited by examiner

THERMAL-MECHANICAL LINEAR ACTUATOR

BACKGROUND

Actuators, such as linear actuators, have a wide variety of different applications. Actuators can be used as a component of a machine, system, or other assembly to move and/or control one or more parts of the machine, system, or other assembly. In some applications, an actuator can be a possible failure point in a system because of its complexity, moving parts, and friction. This can often lead to increased maintenance and repair costs. In some applications where maintenance is difficult or impossible, such as in space applications for example, an actuator can be a cause of reduced lifetime or failure of a given system incorporating the actuator.

BRIEF DESCRIPTION OF THE DRAWINGS

Features and advantages of the subject technology will be apparent from the detailed description which follows, taken in conjunction with the accompanying drawings, which together illustrate, by way of example, features of the subject technology; and, wherein.

Figure 1:
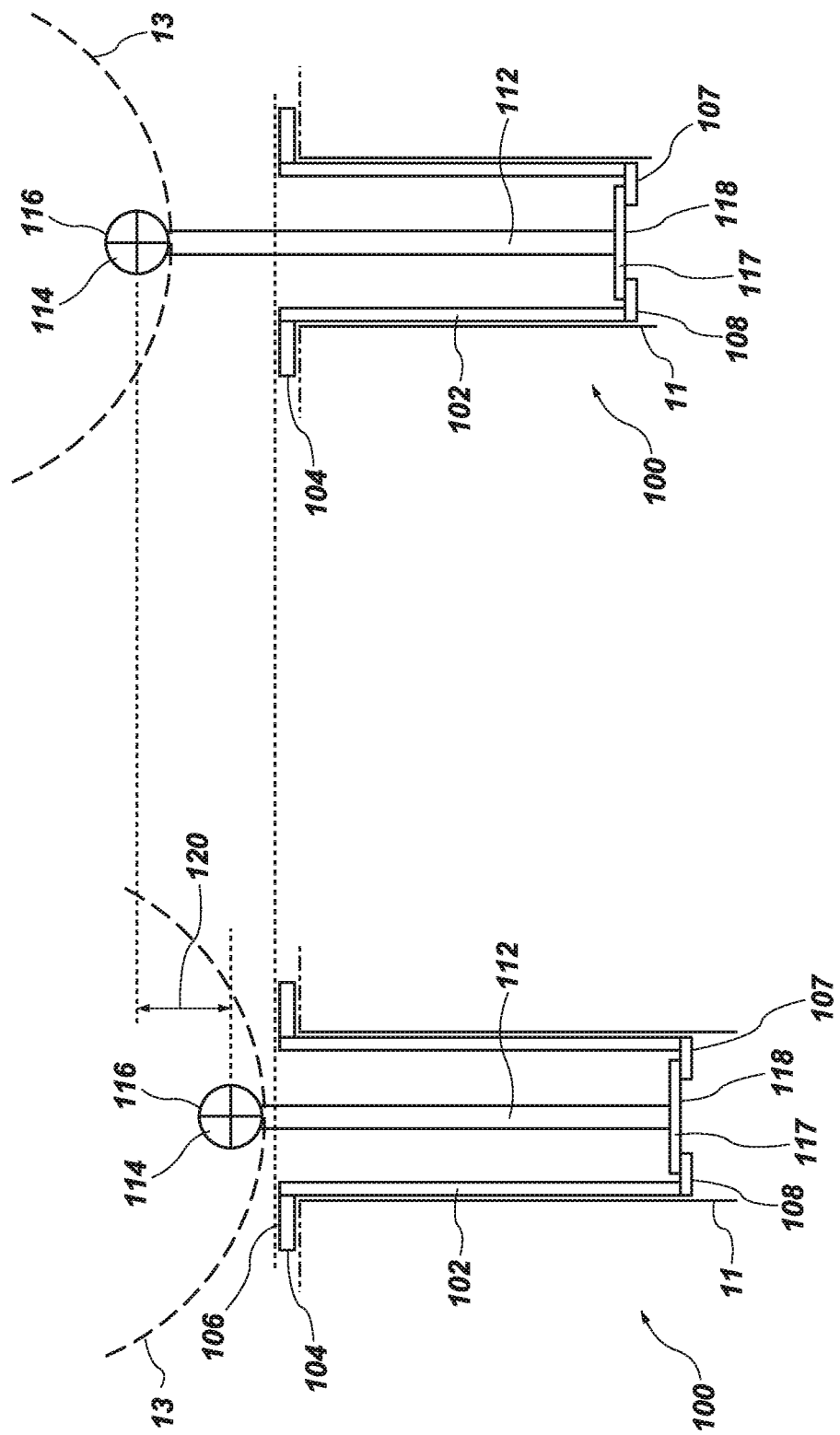
FIG. 1 shows a schematic view of a two-stage thermal-mechanical linear actuator according to one example of the present disclosure.

Reference will now be made to the examples illustrated, and specific language will be used herein to describe the same. It will nevertheless be understood that no limitation of scope is thereby intended.

DETAILED DESCRIPTION

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts is provided below and then specific examples are described in further detail later. This initial summary is intended to aid readers in understanding the examples more quickly, but is not intended to identify key features or essential features of the examples, nor is it intended to limit the scope of the claimed subject matter.

Given the above, there is a need for an actuator that can be simple in design and materials and that can have high reliability due to the lack of moving parts and therefore a lack of friction between parts. Therefore, according to one example of the present disclosure, a thermal-mechanical linear actuator is provided. The actuator can include a first stage comprising one of a positive coefficient of thermal expansion ("CTE") material or a negative CTE material and a second stage comprising the other of the positive CTE material or the negative CTE material, namely the CTE material that was not used in the first stage, or that is opposite in sign (i.e., +/−) from the CTE material selected in the first stage. In other words, the first stage and the second stage can each comprise either one of a positive or negative CTE material (i.e., a CTE material of either positive or negative sign (+/−)), and whichever sign of CTE material is selected for the first stage, such as a positive CTE material in one example, the second stage can be configured with the CTE material that was not selected for the first stage, namely the negative CTE material having a sign opposite that of the positive CTE material in this example. The second stage can be at least partially inserted into the first stage. The actuator can also comprise a thermal isolator disposed between the first stage and the second stage to thermally isolate the first stage from the second stage.

In some examples, the thermal-mechanical linear actuator can further comprise a first heat input associated with the first stage. The first heat input can be operable to heat the first stage. The actuator can also comprise a second heat input associated with a second stage. The second heat input can be operable to heat the second stage.

In some examples, the first heat input can be operable to be controlled independently from the second heat input. In some examples, the first and second heat inputs can be generated by at least one heater. For example, the first heat input can be generated by a first heater comprising a thin-film resistance heater that is disposed at least partially around the first stage, and the second heat input can be generated by a second heater comprising a thin-film resistance heater that is disposed at least partially around the second stage.

In some examples, the actuator can further comprise a first temperature sensor disposed on the first stage. The first heat input can be operable to heat the first stage based at least in part on a temperature sensed by the first temperature sensor. Similarly, the actuator can also comprise a second temperature sensor disposed on the second stage. The second heat input can be operable to heat the second stage based at least in part on a temperature sensed by the first temperature sensor.

In some examples, the thermal-mechanical linear actuator can also comprise hyperbolic meta material wrapped or coated at least partially around an outside of the first stage. In some examples, hyperbolic meta material can be wrapped or coated at least partially around an outside of the second stage. Hyperbolic meta materials can be used to increase the actuator thermal response time by accelerating the radiative exchange with the environment.

In some examples, the thermal-mechanical linear actuator can comprise at least one thermal electric cooler associated with at least one of the first stage or the second stage. The thermal electric cooler can be operable to at least one of heat or cool the thermal-mechanical linear actuator in a controlled manner.

In another example according to the present disclosure, a thermal-mechanical linear actuator can comprise a first stage, a second stage at least partially inserted into the first stage, and hyperbolic meta material wrapped or coated at least partially around an outside of the first stage. The first stage and the second stage can be selectively comprised of alternating positive and negative CTE materials.

In some examples, the thermal-mechanical linear actuator can further comprise a third stage at least partially inserted into the second stage, and a fourth stage at least partially inserted into the third stage. The first, second, third, and fourth stages can be selectively comprised of alternating positive and negative CTE materials.

In some examples, the thermal-mechanical linear actuator can further comprise a thermal isolator disposed between the first stage and the second stage to thermally isolate the first stage from the second stage.

In some examples, the thermal-mechanical linear actuator can comprise a first heat input associated with the first stage. The first heat input can be operable to heat the first stage. The actuator can also comprise a second heat input associated with a second stage. The second heat input can be operable to heat the second stage. The first heat input can be operable to be controlled independently from the second heat input.

In some examples, the first heat input can be generated by a first heater comprising a thin-film resistance heater that is disposed at least partially around the first stage. The second heat input can be generated by a second heater comprising a thin-film resistance heater that is disposed at least partially around the second stage.

In some examples, the thermal-mechanical linear actuator can further comprise a first temperature sensor disposed on the first stage. The first heat input can be operable to heat the first stage based at least in part on a temperature sensed by the first temperature sensor. The actuator can further comprise a second temperature sensor disposed on the second stage. The second heat input can be operable to heat the second stage based at least in part on a temperature sensed by the first temperature sensor.

According to another example, a method for configuring a thermal-mechanical linear actuator can be provided. The method can comprise inserting a first stage of the thermal-mechanical linear actuator at least partially into a second stage of the thermal-mechanical linear actuator. The first stage can comprise one of a positive CTE or a negative CTE material, and the second stage can comprise the other of the positive CTE or the negative CTE material. The method can further comprise thermally isolating the first stage from the second stage.

In some examples, the method can comprise associating the first stage with a first input operable to heat the first stage, and associating the second stage with a second heat input operable to heat the second stage. The first heat input can be generated by a first heater that can comprise a thin-film resistance heater wrapped at least partially around the first stage. The second head input can be generated by a second heater that can comprise a thin-film resistance heater wrapped at least partially around the second stage. The first heater can be independently controlled from the second heater. The method can further comprise at least partially wrapping or coating the first stage with a hyperbolic meta material to increase the actuator thermal response time by accelerating the radiative exchange with the environment.

To further describe the present technology, examples are now provided with reference to the figures. FIG. 1 shows a schematic view of a two-stage thermal-mechanical linear actuator according to one example of the present disclosure. As shown in FIG. 1, a thermal-mechanical linear actuator 100 can comprise a first stage 102 and a second stage 112 that is at least partially inserted into the first stage 102. By "stage" it is meant the various structural components or segments, having one of a positive or negative CTE, that form part of a thermal-mechanical linear actuator.

The first stage 102 can comprise either one of a positive coefficient of thermal expansion ("CTE") material (i.e. a material that expands as temperature increases and contracts as temperature decreases) or a negative CTE material (i.e. a material that expands as temperature decreases and contracts as temperature increases). In addition, the second stage 112 can comprise either one of a positive CTE material of a negative CTE material. However, depending upon which CTE material is selected for either of these stages, say the first stage, the other stage, say the second stage, can be configured to comprise a CTE material with a sign opposite that of the CTE material selected for the first stage. In other words, the first stage can comprise either one of a positive or negative CTE material, and depending upon which one is selected for the first stage, the second stage is configured with the other of the positive CTE material or the negative CTE material not selected for the first stage. State differently, the first stage 102 and the second stage 112 selectively comprise alternating positive and negative CTE materials. Thus, in one example, when the first stage 102 comprises a positive CTE material, the second stage 112 comprises a negative CTE material. In another example, when the first stage 102 comprises a negative CTE material, the second stage 112 comprises a positive CTE material.

The materials comprising the positive and negative CTE materials can be metallic materials. For example, the positive CTE material can comprise steel, aluminum, titanium, and various alloys thereof. The negative CTE material can comprise any known in the art, such as the specialized titanium alloy distributed under the trade name ALLVAR.

In this example, the first stage 102 can be formed in a hollow cylindrical configuration. This is of course only an example of one possible configuration, and one of ordinary skill in the art will recognize that other configurations could also be used. Indeed, the first stage 102 can comprise any suitable size, shape or configuration. In the example shown, the first stage 102 can comprise an attachment flange 104 that extends outward and that is formed at a first end 106 of the of the first stage 102. The attachment flange 104 can be operable to mount the thermal-mechanical linear actuator 100 to an object or device 11. The first stage 102 can further comprise a stage interface 107 formed at a second end 108 of the first stage 102. The stage interface 107 can comprise an attachment or mounting structure and surface sized and configured to facilitate attachment or coupling or mounting of the second stage 112 to the first stage 102 of the thermal-mechanical linear actuator 100. The stage interface 107 can comprise, for example, an inwardly extending flange at a second end 108 of the first stage 102, which flange can operate to provide a structural component suitable for engaging the second stage 112, such as for mounting or attaching the second stage 112.

The second stage 112 can be formed as an elongated cylinder in one example, although this is not intended to be limiting in any way as the second stage 112 can comprise any suitable size, shape or configuration. The second stage 112 can comprise an actuator attachment point 114 disposed at a first end 116 of the second stage 112. The actuator attachment point 114 can be operable to connect the thermal-mechanical linear actuator 100 to another object/device 13 that is to be actuated relative to the object/device 11 attached to the attachment flange 104 of the first stage 102. In this example, the actuator attachment point 114 is shown as a ball such as to form a part of a ball and socket type joint. However, the attachment point 114 can comprise any suitable structure, mechanism, or system for attaching the thermal-mechanical linear actuator 100 to another object/device 13.

The second stage 112 can comprise a stage interface 117 disposed at a second end 118 of the second stage 112. The stage interface 117 can comprise any suitable structural element or combination of elements sized and configured to facilitate attachment/coupling of the second stage 112 to the first stage 102 of the thermal-mechanical linear actuator 100. In the example shown, the stage interface 117 can comprise an outwardly extending flange that engages with and seats against the inwardly extending flange of the first stage 102, wherein the stage interface 117 operates to provide an attachment/coupling point to attach or couple the second end 118 of the second stage 112 to the first stage 102. The stage interface 117 of the second stage 112 can attach or couple to the stage interface 107 of the first stage 102 via any known means, such as a fastener, adhesive, a mechanism, or the like.

With the second stage 112 being at least partially inserted or nested into the first stage 102 and coupled together, and with the first and second stages 102, 112 selectively comprising alternating positive and negative CTE materials, the thermal-mechanical linear actuator 100 can be actuated to cause a change in length or distance 120 between the actuator attachment point 114 and the attachment flange 104 of the thermal-mechanical linear actuator 100 at different temperatures. In the example shown in FIG. 1, the first stage 102 can comprise the negative CTE material, and the second stage 112 can comprise the positive CTE material. As a temperature is increased, the first stage 102 contracts or shortens and the second stage 112 expands or lengthens. The shortening of the first stage 102 and the lengthening of the second stage 102 results in the change of length or distance 120 between the actuator attachment point 114 and the attachment flange 104 of the thermal-mechanical linear actuator 100. This results in the movement of an object/device 13 attached to the attachment point 114 of the thermal-mechanical linear actuator 100 relative to an object/device 11 attached to the attachment flange of the thermal-mechanical linear actuator 100. Thus, the thermal-mechanical linear actuator 100 can be actuated based on a change in temperature. This actuation is accomplished without moving parts, thereby increasing the reliability of the actuator and lowering the costs of the actuator as compared to prior actuators.

Figure 2:
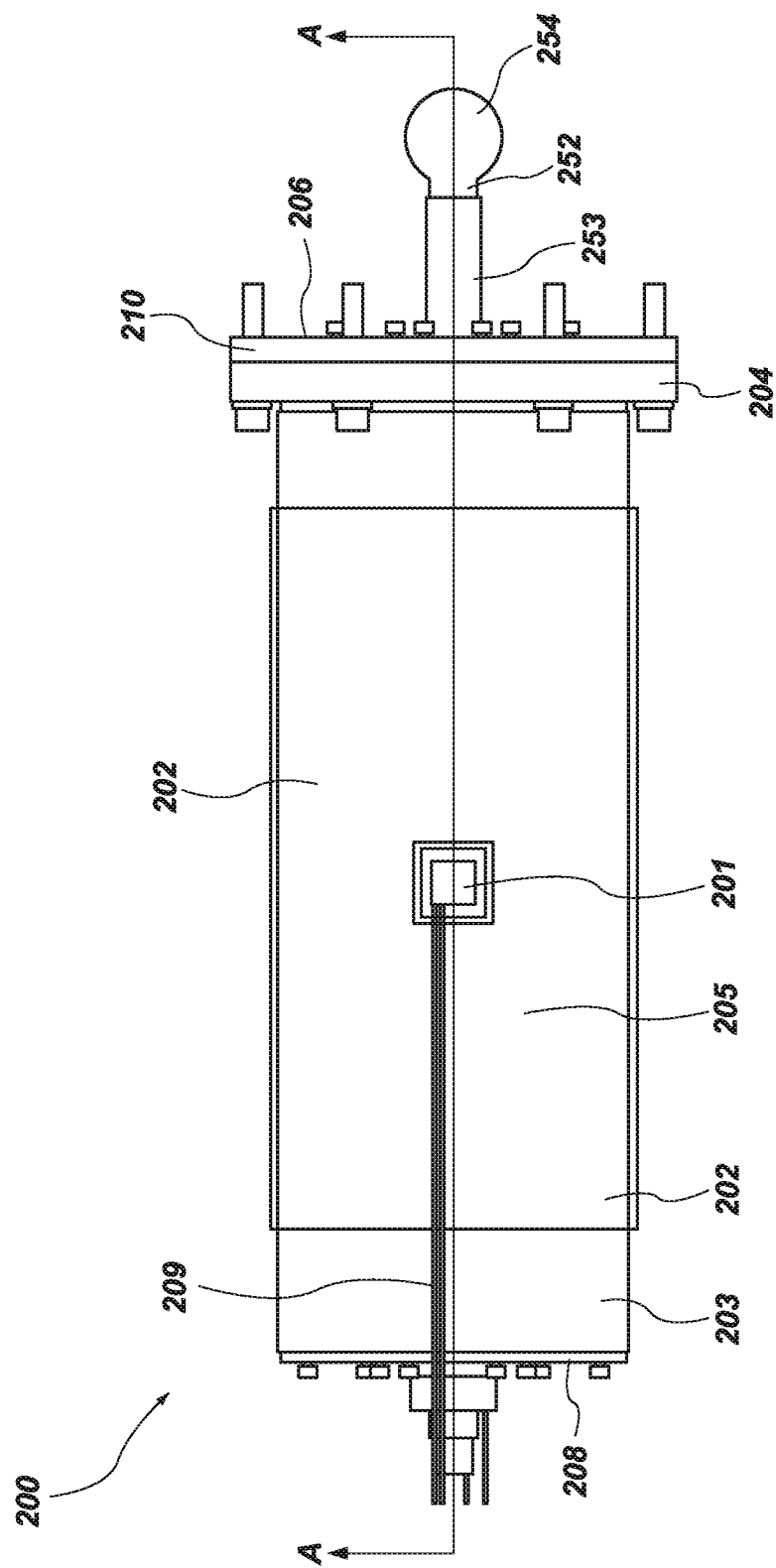
FIG. 2 shows a side view of a multi-stage, thermal-mechanical linear actuator according to one example of the present disclosure.
Figure 3:
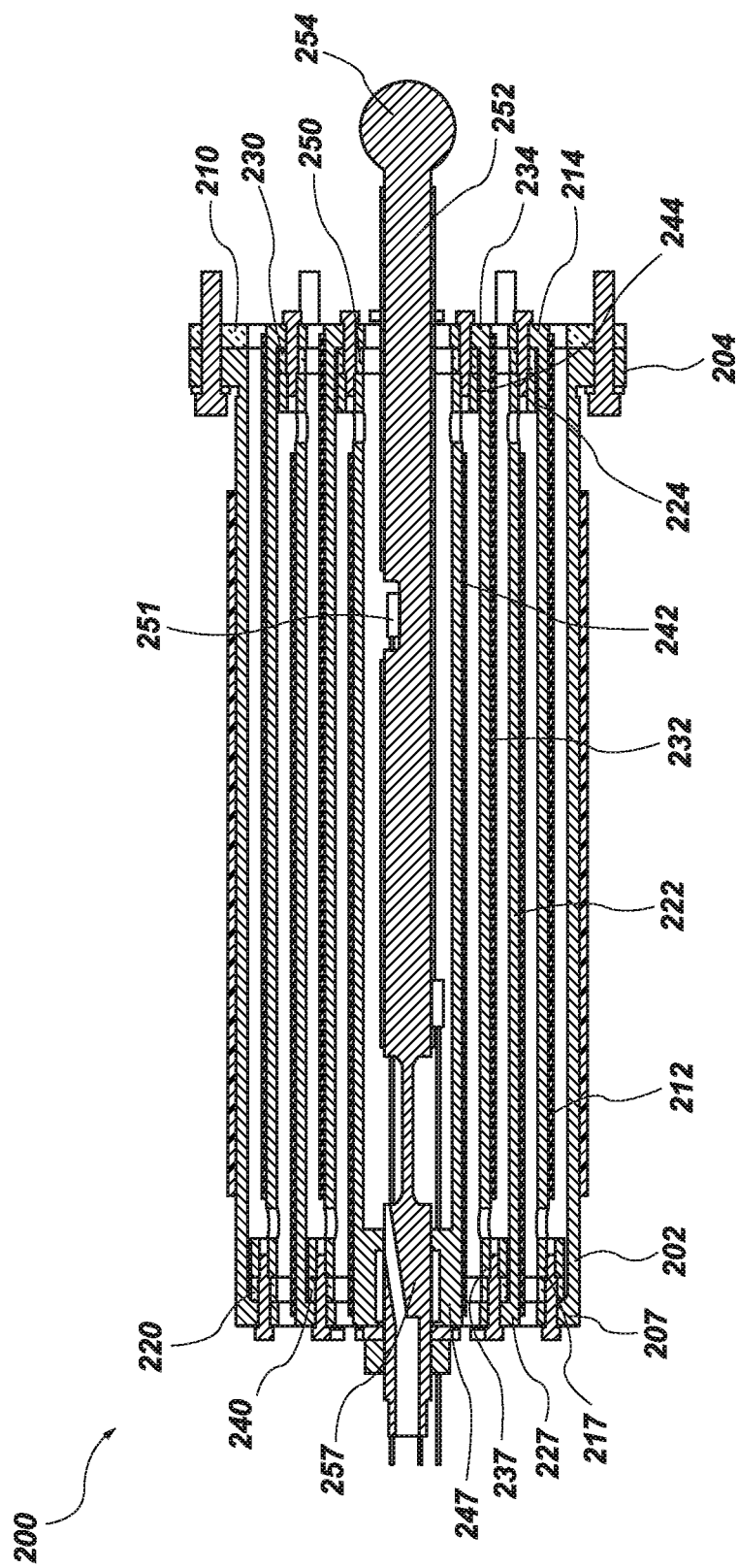
FIG. 3 shows a section view of the multi-stage, thermal-mechanical linear actuator of FIG. 2 taken along the line A-A in FIG. 2.
Figure 4:
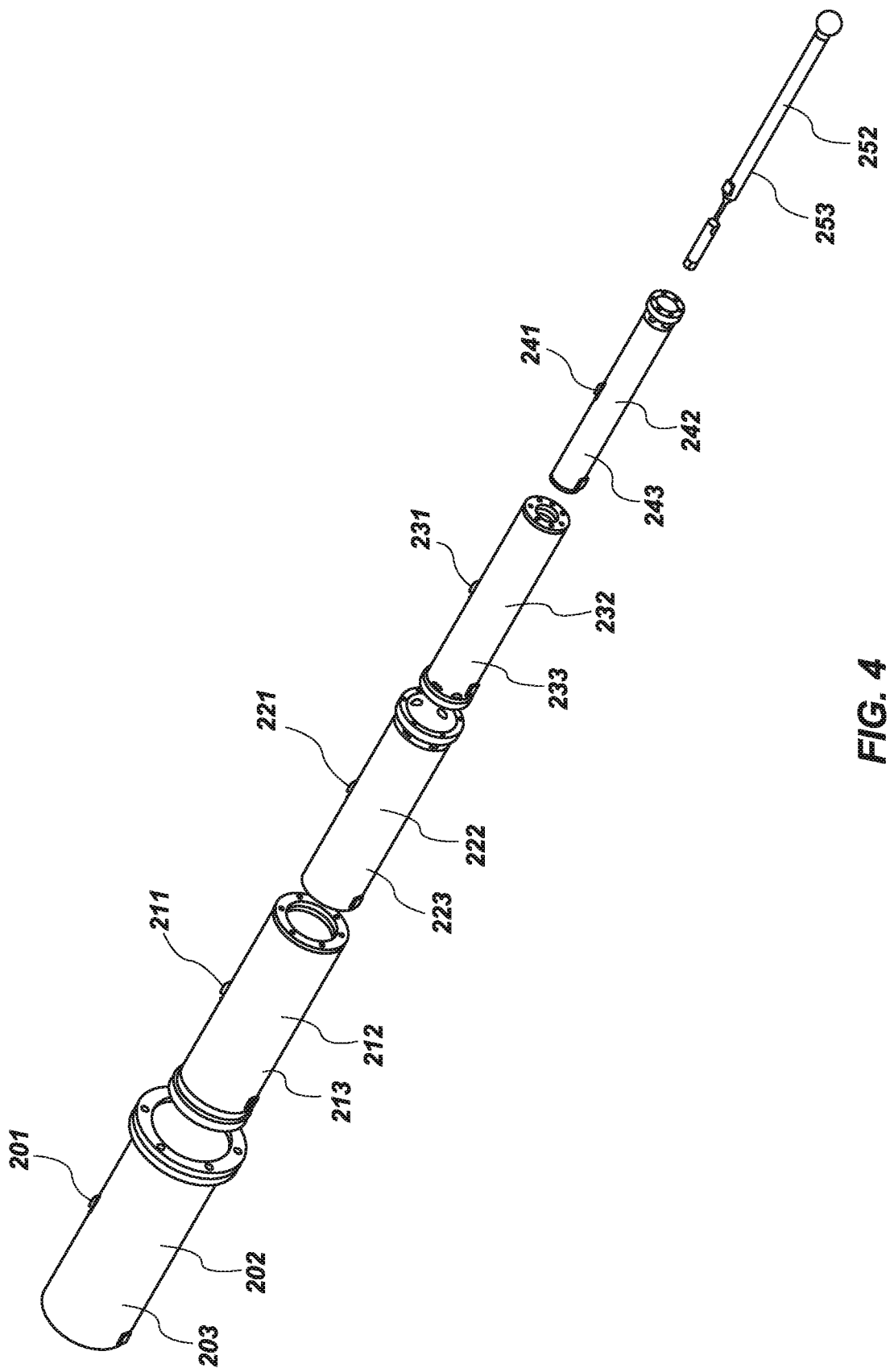
FIG. 4 shows an exploded view of the multi-stage, thermal-mechanical linear actuator of FIG. 2.
Figure 5:
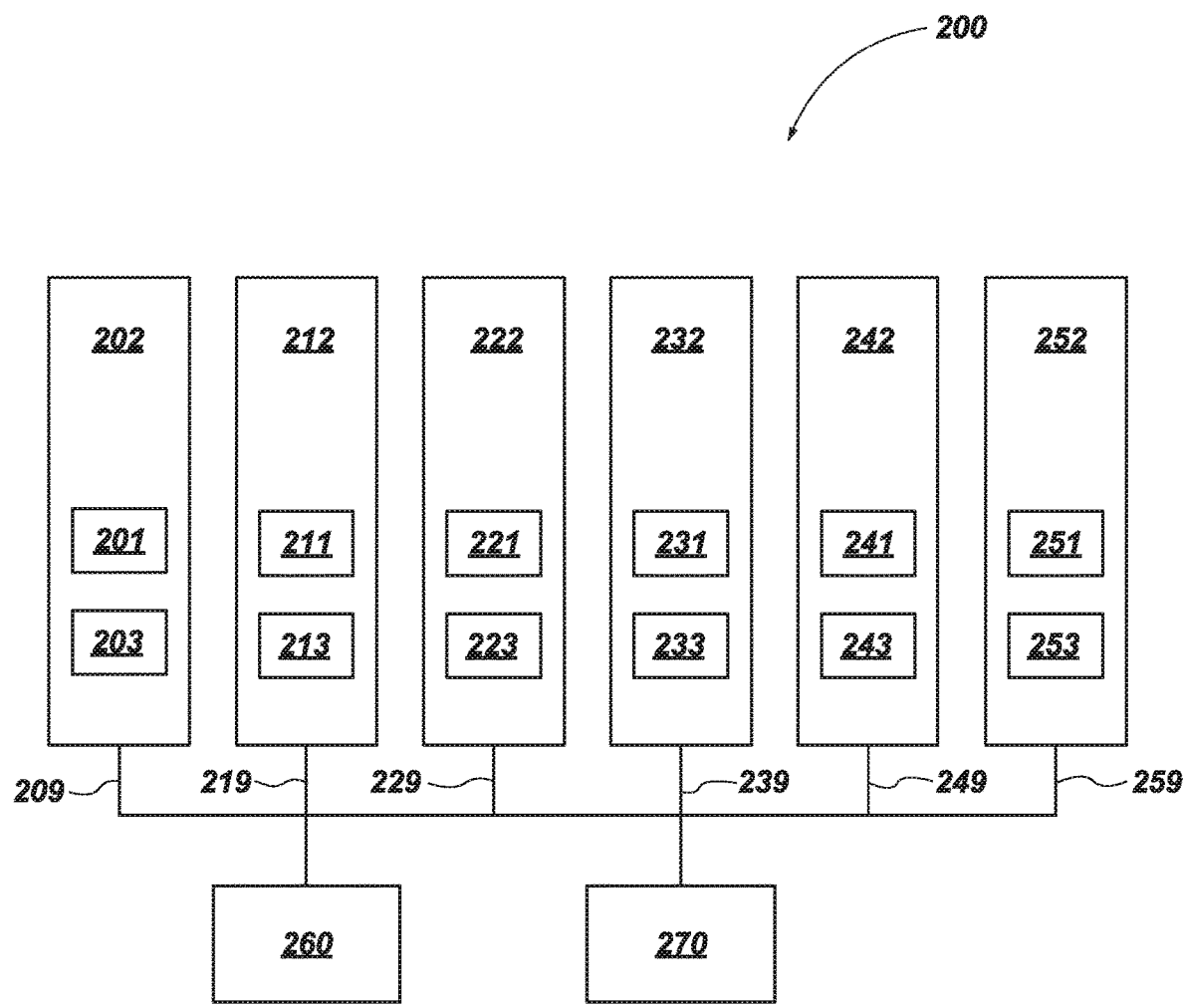
FIG. 5 shows a schematic view of the multi-stage, thermal-mechanical linear actuator of FIG. 2.

FIG. 2 shows a side view of a multi-stage, thermal-mechanical linear actuator according to one example of the present disclosure, FIG. 3 shows a section view of the multi-stage, thermal-mechanical linear actuator of FIG. 2 taken along the line A-A, FIG. 4 shows an exploded view of the multi-stage, thermal-mechanical linear actuator of FIG. 2, and FIG. 5 shows a schematic view of the multi-stage, thermal-mechanical linear actuator of FIG. 2. The advantage of having multiple stages within a thermal-mechanical linear actuator can be to provide an increased stroke for a given temperature change or to provide the ability to manipulate the actuator to allow for more precise control of the actuator for a given temperature change.

Referring to FIGS. 2-5, a multistage thermal-mechanical linear actuator 200 is provided. The multi-stage, thermal-mechanical linear actuator 200 can comprise a plurality of stages. In this example, the multi-stage thermal-mechanical actuator comprises a first stage 202, a second stage 212, a third stage 222, a fourth stage 232, a fifth stage 242, and a sixth stage 252. However, any number of stages could be provided, therefore the number of stages shown herein is merely exemplary. The stages 202, 212, 222, 232, 242, 252 can comprise any suitable size, shape, and configuration. In this example, the stages 202, 212, 222, 232, 242 can comprise hollow cylindrical shapes, and the stage 252 can comprise a relatively thin cylindrical shape. Other configurations could also be used, and as such, the example above is not intended to be limiting in any way.

The stages 202, 212, 222, 232, 242, 252, are nested together to form the multi-stage, thermal-mechanical linear actuator 200. In this example, the sixth stage 252 is at least partially inserted or nested into the fifth stage 242, the fifth stage 242 is at least partially inserted or nested into the fourth stage 232, the fourth stage 232 is at least partially inserted or nested into the third stage 222, the third stage 222 is at least partially inserted or nested into the second stage 212, and the second stage 212 is at least partially inserted or nested into the first stage 202, as shown in FIGS. 3 and 4.

The stages 202, 212, 222, 232, 242, 252 are selectively comprised of alternating positive and negative CTE materials. In other words, each of the stages 202, 212, 222, 232, 242, 252 comprises an opposite positive or negative CTE material from the stages adjacent to it. For example, when the first stage 202 comprises a positive CTE material, the second stage 212 comprises a negative CTE material, the third stage 222 comprises a positive CTE material, and so forth. By utilizing alternating CTE materials, the overall stroke of the multi-stage, thermal-mechanical linear actuator 200 can be controlled (i.e. the relative change in length or distance between attachment points of the actuator 200 can be controlled), as will be explained in more detail below.

In one example, the multi-stage, thermal-mechanical linear actuator 200 can comprise at least one heat input to provide heat to the stages 202, 212, 222, 232, 242, 252 to control the length of the stages 202, 212, 222, 232, 242, 252. In some examples, the temperature of the stages 202, 212, 222, 232, 242, 252 can be individually controlled to more precisely control the overall length of the individual stages of the multi-stage, thermal-mechanical linear actuator 200. To this end, there can be a plurality of heat inputs where each heat input is associated with one of the stages 202, 212, 222, 232, 242, 252, respectively. The heat inputs can provide heat to the stages 202, 212, 222, 232, 242, 252 to increase the temperature of one or more of the stages 202, 212, 222, 232, 242, 252 as desired. As heat is provided to one or more of the stages 202, 212, 222, 232, 242, 252, the stages that are heated will lengthen or shorten based on the positive or negative CTE material of the stages.

In this example, the heat inputs can each comprise a heater. For example, the first stage 202 can comprise a first heater 203, the second stage 212 can comprise a second heater 213, the third state 222 can comprise a third heater 223, the fourth stage 232 can comprise a fourth heater 233, the fifth stage 242 can comprise a fifth heater 243, and the sixth stage 252 can comprise a sixth heater 253. Each of the heaters 203, 213, 223, 233, 243, 253 can be a thin film resistance heater. Examples of thin film resistance heater include heaters that are available under the trade name KAPTON heaters. Each of the heaters 203, 213, 223, 233, 243, 253 can be wrapped at least partially around respective stages 202, 212, 222, 232, 242, 252. Thus, the heaters 203, 213, 223, 233, 243, 253 can be operable to cover a portion or all of an outer surface of respective stages 202, 212, 222, 232, 242, 252. While in the examples shown the heaters 203, 213, 223, 233, 243, 253 are disposed on the outside surfaces of respective stages 202, 212, 222, 232, 242, 252, the heaters 203, 213, 223, 233, 243, 253 could alternatively be disposed on inside surfaces of the stages 202, 212, 222, 232, 242, 252. In some examples, heaters could be disposed on both the inside and outside surfaces of all or some of the stages 202, 212, 222, 232, 242, 252.

In another example, instead of heaters, the heat inputs can comprise thermal electric coolers in place of the heaters 203, 213, 223, 233, 243, 253. The thermal electric heaters can be operable to both heat and cool the respective stages 202, 212, 222, 232, 242, 252 in a controlled manner.

The heaters 203, 213, 223, 233, 243, 253 (or thermal electric coolers) can be controlled at least in part based on feedback received from a temperature sensor. In this example each of the stages 202, 212, 222, 232, 242, 252 can comprise respective temperature sensors 201, 211, 221, 231, 241, 251. In this example. The temperature sensors 201, 211, 221, 231, 241, 251 can be disposed on outer surfaces of the stages 202, 212, 222, 232, 242, 252. Each of the heaters (or thermal electric coolers) 203, 213, 223, 233, 243, 253 and temperature sensors 201, 211, 221, 231, 241, 251 can be connected to a control unit 260 via one or more leads 209, 219, 229, 239, 249, 259, respectively. The control unit 260 can comprise a processor and one or more memories comprising control instructions, which when operated, cause the processor to receive input from the temperature sensors 201, 211, 221, 231, 241, 251 and to control one or more of the heaters (or thermal electric coolers) 203, 213, 223, 233, 243, 253 to heat one or more of the stages 202, 212, 222, 232, 242, 252 in a controlled manner, such as the amount of temperature input, the rate of change of the temperature input, the duration of time of temperature input, and other variables. The multi-stage, thermal-mechanical linear actuator 200 can further comprise a power source 270 such as a battery or other type of power source that provides power to the processor control unit 260 and the various stages 202, 212, 222, 232, 242, 252 and their heaters (or thermal electric coolers).

In order to increase an actuation response time of the stages 202, 212, 222, 232, 242, 252 of the multi-stage, thermal-mechanical linear actuator 200, one or more of the stages 202, 212, 222, 232, 242, 252 can comprise a hyperbolic meta material 205 ("HMM") wrapped or coated at least partially around the stage. The HMM can be wrapped or coated around an outside surface of a given stage and the outside of a heater on a given stage, or the heater can be disposed on an inside of the stage and the HMM can be wrapped or coated on the outside of the stage. The HMM 205 can be operable to increase or accelerate the radiative exchange rate between the HMM wrapped stages of the multi-stage, thermal-mechanical linear actuator 200 and an environment (e.g., heat dissipation into the environment from the multi-stage, thermal-mechanical linear actuator 200), allowing the multi-stage, thermal-mechanical linear actuator 200 to cool more quickly, thus effectuating more rapid actuation in the opposing direction from the actuation direction achieved when the temperature in one or more stages is increased. In one example, the HMM 205 can be wrapped or coated around the first stage 202 (i.e. the outermost stage) to facilitate radiative exchange between the multi-stage, thermal-mechanical linear actuator 200 and the environment. The use of an HMM 205 wrapped or coated at least partially around the first stage can improve the responsiveness of the multi-stage, thermal-mechanical linear actuator 200 by twenty times when compared to a multi-stage, thermal-mechanical linear actuator without an HMM layer.

The multi-stage, thermal-mechanical linear actuator 200 can be configured to be thermally isolated from an object/device, and can be configured such that the stages 202, 212, 222, 232, 242, 252 are thermally isolated from one another. In this manner, when one of the stages 202, 212, 222, 232, 242, 252 is heated, the heat can be prevented from transferring to other stages. This can facilitate increased control over the length of the individual stages 202, 212, 222, 232, 242, 252. The first stage 202 can comprise an attachment flange 204 that can be operable to attach the multi-stage, thermal-mechanical linear actuator 200 to an object/device. To thermally isolate the multi-stage, thermal-mechanical linear actuator 200 from the object/device, a thermal isolator such as an insulator 210 can be provided between the attachment flange 204 and the object/device.

The first stage 202 can attach or couple to the second stage 212 via an attachment interface 207 of the first stage 202 and an attachment interface 217 of the second stage 212. A thermal isolator such as an insulator 220 can be provided between the attachment interfaces 207, 217 to thermally isolate the first stage 202 from the second stage 212.

The second stage 212 can attach or couple to the third stage 222 via an attachment interface 214 of the of the second stage 212 and an attachment interface 224 of the third stage 222. A thermal isolator such as an insulator 230 can be provided between the attachment interfaces 214, 224 to thermally isolate the second stage 212 from the third stage 222.

The third stage 222 can attach or couple to the fourth stage 232 via an attachment interface 227 of the of the third stage 222 and an attachment interface 237 of the fourth stage 232. A thermal isolator such as an insulator 240 can be provided between the attachment interfaces 227, 237 to thermally isolate the third stage 222 from the fourth stage 232.

The fourth stage 232 can attach or couple to the fifth stage 242 via an attachment interface 234 of the of the fourth stage 232 and an attachment interface 244 of the fifth stage 242. A thermal isolator such as an insulator 250 can be provided between the attachment interfaces 234, 244 to thermally isolate the third stage 222 from the fourth stage 232.

The fifth stage 242 can attach or couple to the sixth stage 252 via an attachment interface 247 of the of the fifth stage 242 and an attachment interface 257 of the fifth stage 242. In some examples, a thermal isolator such as an insulator can be provided between the interfaces 247, 257 to thermally isolate the fifth stage 242 and sixth stage 252. In some examples, the sixth stage 252 can comprise a narrow portion as a thermal isolator to decrease the rate of heat transfer between the fifth stage 242 and the sixth stage 252 as compared to the rate of heat transfer without the thermal isolator. The sixth stage can comprise an actuator attachment point 254 that can be operable to connect the multi-stage, thermal-mechanical linear actuator 200 to another object/device that is to be actuated relative to the object/device attached to the attachment flange 204 of the first stage 202.

To actuate the multi-stage, thermal-mechanical linear actuator 200, one or more of the heaters 203, 213, 223, 233, 243, 253 can be selectively controlled (such as via the control unit 260) to provide heat to one or more of the stages 202, 212, 222, 232, 242, 252. By applying heat to one or more of the stages 202, 212, 222, 232, 242, 252, the length of the one or more of the stages 202, 212, 222, 232, 242, 252 can change according to the CTE of the material of that stage. For a positive CTE material, the length of the stage can increase corresponding to the added heat. For a negative CTE material, the length of the stage can decrease corresponding to the added heat. The amount of change in length for a given stage and for a predetermined temperature change can vary based on the CTE for the material used in the stage. Moreover, the amount of change in length can vary depending upon the degree of temperature change with respect to each stage. As heat is added to one more of the stages 202, 212, 222, 232, 242, 252 to change the length of the stages, the relative length or distance between the attachment flange 204 of the first stage and the actuator attachment point 254 of the sixth stage can change, thereby actuating the multi-stage, thermal-mechanical linear actuator 200. The multi-stage, thermal-mechanical linear actuator 200 can reverse the actuation by dissipating the heat added to the one or more stages. The heat dissipation can be facilitated via the HMM 205 wrapped or coated at least partially around one or more of the stages (e.g. wrapped or coated at least partially around the first stage 202 and optionally wrapped or coated at least partially around one or more of the second through sixth stages 212, 222, 232, 242, 252). Each of the stages 202, 212, 222, 232, 242, 252 can further be caused to expand or contract at a given rate. Indeed, the rate of change in length of any given stage can be controlled by controlling temperature increase/decrease input to each stage, and the rate at which the temperature changes. This can be achieved via the control unit 260.

Figure 6:
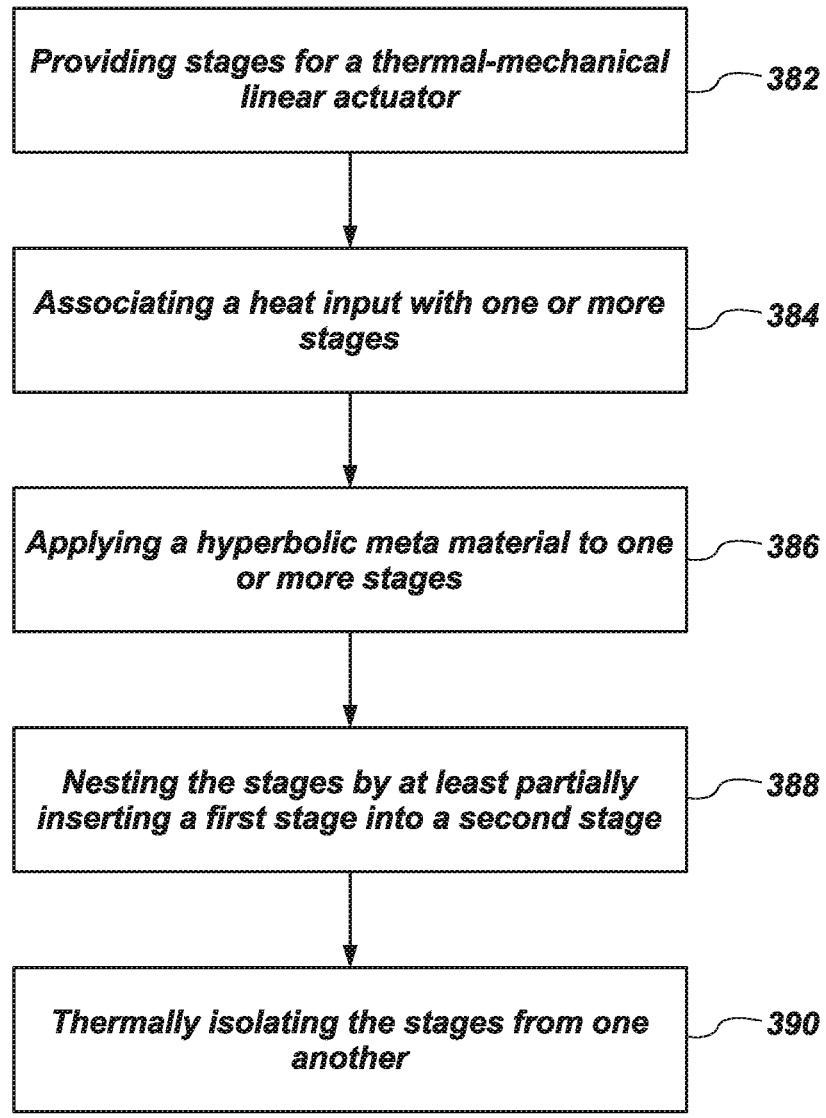
FIG. 6 shows a method of configuring a thermal-mechanical linear actuator according to one example of the present disclosure.

FIG. 6 shows a method of configuring a thermal-mechanical linear actuator according to one example of the present disclosure. Referring to FIGS. 2-6, a thermal-mechanical linear actuator, such as the actuator 200, can be configured by first providing stages for a thermal-mechanical linear actuator as shown in step 382. The stages can be formed in a long, hollow cylindrical shape such as stages 202, 212, 222, 232, 242 shown in FIGS. 2-4 or as a thin cylindrical shape such as stage 252. The stages can be formed from both positive and negative CTE materials so that the stages can later be assembled with alternating positive and negative CTE materials as explained above. The stages can be formed from metallic or composite materials. The positive CTE materials can comprise steel, aluminum, titanium, alloys thereof, or any other suitable metallic or composite material. The negative CTE materials can comprise ALLVAR or other suitable materials. This method can be applicable to and associated with any of the thermal-mechanical linear actuator examples discussed herein.

In step 384, one or more of the stages can be associated with a heat input to provide heat to the stages to thereby lengthen or shorten the respective stages. As mentioned above each stage 202, 212, 222, 232, 242, 252 can be associated with a heat or cool input to individually control heating and/or cooling of each stage. In this example, the heat inputs can comprise heaters 203, 213, 223, 233, 243, and 253. The heaters 203, 213, 223, 233, 243, 253 can be thin-film resistance heaters that can be wrapped at least partially around the stages 202, 212, 222, 232, 242, 252. In one example, the heaters 203, 213, 223, 233, 243, 253 can be wrapped around respective outside surfaces of the stages 202, 212, 222, 232, 242, 252. In addition, or alternatively, the heaters 203, 213, 223, 233, 243, 253 can be applied to respective inside surfaces of one or more of the stages 202, 212, 222, 232, 242. Additionally, thermometers 201, 211, 221, 231, 241, 251 can be applied to each of the stages to provide feedback regarding a temperature of each stage. Electrical leads 209, 219, 229, 239, 249, 259 can be attached to heaters and thermometers of each stage to receive feedback from the thermometers 201, 211, 221, 231, 241, 251 and to control the heaters 203, 213, 223, 233, 243, 253.

In step 386, a layer of hyperbolic meta material 205 can be applied to one or more of the stages. For example, the layer of hyperbolic meta material 205 can be wrapped or coated around the outermost stage (e.g. stage 202 in the example shown). The hyperbolic meta material can facilitate an increased rate of radiative exchange between the thermal-mechanical linear actuator to and an environment. In some examples, a layer of hyperbolic meta material can be applied to more than just the outermost stage, or to all of the stages.

In step 388, the stages can be nested together by at least partially inserting a first stage into a second stage, a second stage into a third stage, and so on based on the number of stages to be included in the thermal-mechanical linear actuator. In step 390, the stages can be thermally isolated from one another. In the example shown in FIGS. 3 and 4, the stages 202, 212, 222, 232, 242, 252 are thermally isolated from one another via insulators 220, 230, 240, 250, and via a narrow portion of the stage 252. In this example, when stage interfaces are attached or coupled together via fasteners in the nested positions such as shown in FIG. 3, the insulators thermally isolate the stages from one another, allowing for more precise control over the temperature of each stage, and therefore the overall length of the thermal-mechanical linear actuator.

The above described thermal-mechanical linear actuators, such as actuators 100, 200, and method for configuring a thermal actuator can be implemented in several applications. For example, the thermal-mechanical linear actuators described herein can be implemented in space applications, such as for adjusting and moving mirrors or other objects in a space environment. In such an environment, the thermal-mechanical linear actuators described herein can provide high reliability due to the lack of moving parts and friction. They can also decrease costs of the system in which they are implemented due to their simplicity and decreased need for maintenance. By use of an HMM wrapped or coated around at least an outer stage of the thermal-mechanical linear actuator, actuation response times of the thermal-mechanical linear actuator can be increased (as compared to the thermal-mechanical linear actuator without an HMM wrapped stage) to allow for precise and responsive control of the thermal-mechanical linear actuator. The above-described thermal-mechanical linear actuator could also be used for thermal switches or for thermal struts, as well as other applications that will be recognized by one of ordinary skill in the art.

By thermally isolating the stages from one another, and by allowing for individual control over the heat of each stage through respective heat inputs, the thermal-mechanical linear actuator can be precisely controlled. One example of a six-stage thermal-mechanical linear actuator such as the actuator 200 described above will be described to illustrate control and actuation of a thermal-mechanical linear actuator. This example is not intended to be limiting, but to help to further aid in understanding of the present disclosure. In this example, six stages are incorporated similar to that shown in FIGS. 2-4. Each stage has a length of five inches. The outermost stage or first stage comprises Ti 6Al-4V and the third and fifth stages comprise AL 6061 T6. The second, fourth, and sixth stages comprise Allvar. In this example, course translation, or translation on the order of ten-thousandth of an inch can be achieved with a ±10° C. temperature change. Specifically, in this example, a total stroke of 7 mils can be achieved with a ±10° C. temperature which can be beneficial in many space applications. In this example, fine translation such as on the order of a one-half micron translation can be achieved by changing the temperature of only a single stage by ±1° C. Superfine translation such as on the order of less than one-half micron can by achieved by controlling the temperature of one of the positive CTE material stages and one of the negative CTE material stages, for example.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A thermal-mechanical linear actuator, comprising:
    a first stage comprising one of a positive coefficient of thermal expansion ("CTE") material or a negative CTE material;
    a second stage comprising the other of the positive CTE material or the negative CTE material, the second stage being at least partially inserted into the first stage; and
    a thermal isolator disposed between the first stage and the second stage to thermally isolate the first stage from the second stage.

2. The thermal-mechanical linear actuator of claim 1, further comprising:
    a first heat input associated with the first stage, the first heat input being operable to heat the first stage;
    a second heat input associated with a second stage, the second heat input being operable to heat the second stage.

3. The thermal-mechanical linear actuator of claim 2, wherein the first heat input is operable to be controlled independently from the second heat input.

4. The thermal-mechanical linear actuator of claim 2, wherein the first and second heat inputs are generated by at least one heater.

5. The thermal-mechanical linear actuator of claim 2, wherein the first heat input is generated by a first heater comprising a thin-film resistance heater that is disposed at least partially around the first stage, and wherein the second heat input is generated by a second heater comprising a thin-film resistance heater that is disposed at least partially around the second stage.

6. The thermal-mechanical linear actuator of claim 2, further comprising:
    a first temperature sensor disposed on the first stage, the first heat input being operable to heat the first stage based at least in part on a temperature sensed by the first temperature sensor; and
    a second temperature sensor disposed on the second stage, the second heat input being operable to heat the second stage based at least in part on a temperature sensed by the first temperature sensor.

7. The thermal-mechanical linear actuator of claim 1, further comprising hyperbolic meta material wrapped or coated at least partially around an outside of the first stage.

8. The thermal-mechanical linear actuator of claim 7, further comprising hyperbolic meta material wrapped or coated at least partially around an outside of the second stage.

9. The thermal-mechanical linear actuator of claim 1, further comprising at least one thermal electric cooler associated with at least one of the first stage or the second stage, the thermal electric cooler being operable to at least one of heat or cool the thermal-mechanical linear actuator in a controlled manner.

10. A thermal-mechanical linear actuator comprising:
    a first stage;
    a second stage at least partially inserted into the first stage; and
    hyperbolic meta material wrapped or coated at least partially around an outside of the first stage,
    wherein the first stage and the second stage are selectively comprised of alternating positive and negative CTE materials.

11. The thermal-mechanical linear actuator of claim 10, further comprising
    a third stage at least partially inserted into the second stage; and
    a fourth stage at least partially inserted into the third stage, wherein
    the first, second, third, and fourth stages are selectively comprised of alternating positive and negative CTE materials.

12. The thermal-mechanical linear actuator of claim 10, further comprising a thermal isolator disposed between the first stage and the second stage to thermally isolate the first stage from the second stage.

13. The thermal-mechanical linear actuator of claim 12, further comprising:
    a first heat input associated with the first stage, the first heat input being operable to heat the first stage;
    a second heat input associated with a second stage, the second heat input being operable to heat the second stage.

14. The thermal-mechanical linear actuator of claim 13, wherein the first heat input is operable to be controlled independently from the second heat input.

15. The thermal-mechanical linear actuator of claim 13, wherein the first heat input is generated by a first heater comprising a thin-film resistance heater that is disposed at least partially around the first stage, and wherein the second heat input is generated by a second heater comprising a thin-film resistance heater that is disposed at least partially around the second stage.

16. The thermal-mechanical linear actuator of claim 13, further comprising:
    a first temperature sensor disposed on the first stage, the first heat input being operable to heat the first stage based at least in part on a temperature sensed by the first temperature sensor; and
    a second temperature sensor disposed on the second stage, the second heat input being operable to heat the second stage based at least in part on a temperature sensed by the first temperature sensor.

17. A method for configuring a thermal-mechanical linear actuator, the method comprising:
inserting a first stage of the thermal-mechanical linear actuator at least partially into a second stage of the thermal-mechanical linear actuator, the first stage comprising one of a positive CTE or a negative CTE material, and the second stage comprising the other of the positive CTE or the negative CTE material; and
thermally isolating the first stage from the second stage.

18. The method of claim 17, further comprising:
associating the first stage with a first heat input operable to heat the first stage, and
associating the second stage with a second heat input operable to heat the second stage.

19. The method of claim 18, wherein
the first heat input is generated by a first heater comprising a thin-film resistance heater wrapped at least partially around the first stage,
the second heat input is generated by a second heater comprising a thin-film resistance heater wrapped at least partially around the second stage, and
wherein the first heater is independently controlled from the second heater.

20. The method of claim 17, further comprising at least partially wrapping or coating the second stage with a hyperbolic meta material.

* * * * *